April 16, 1957  M. B. OWEN  2,788,754
SLUDGE DRYING FURNACE WITH GAS DEODORIZING CHAMBER Filed Nov. 30, 1955  2 Sheets-Sheet 1

INVENTOR.
MARK B. OWEN.
BY
ATTORNEYS

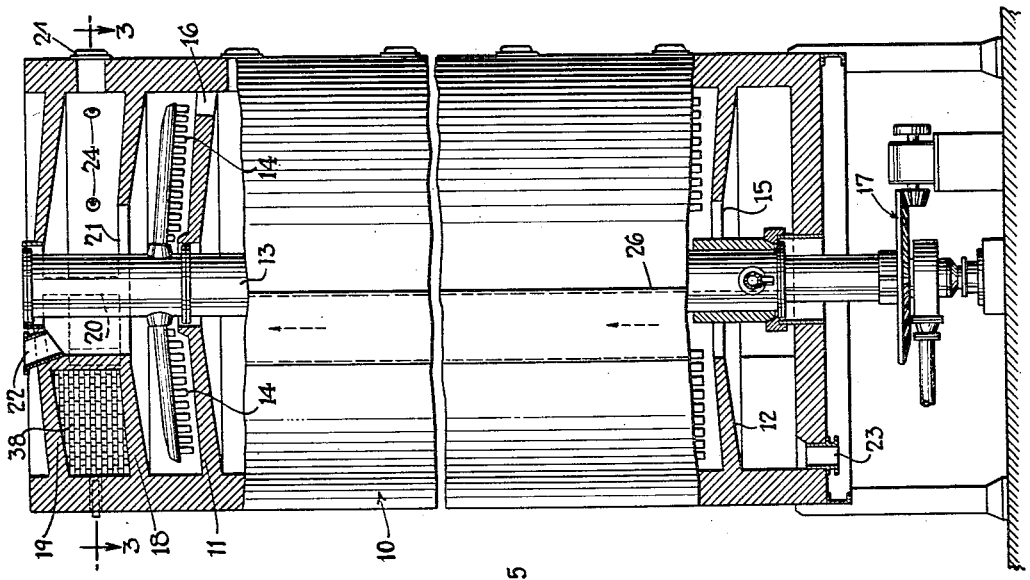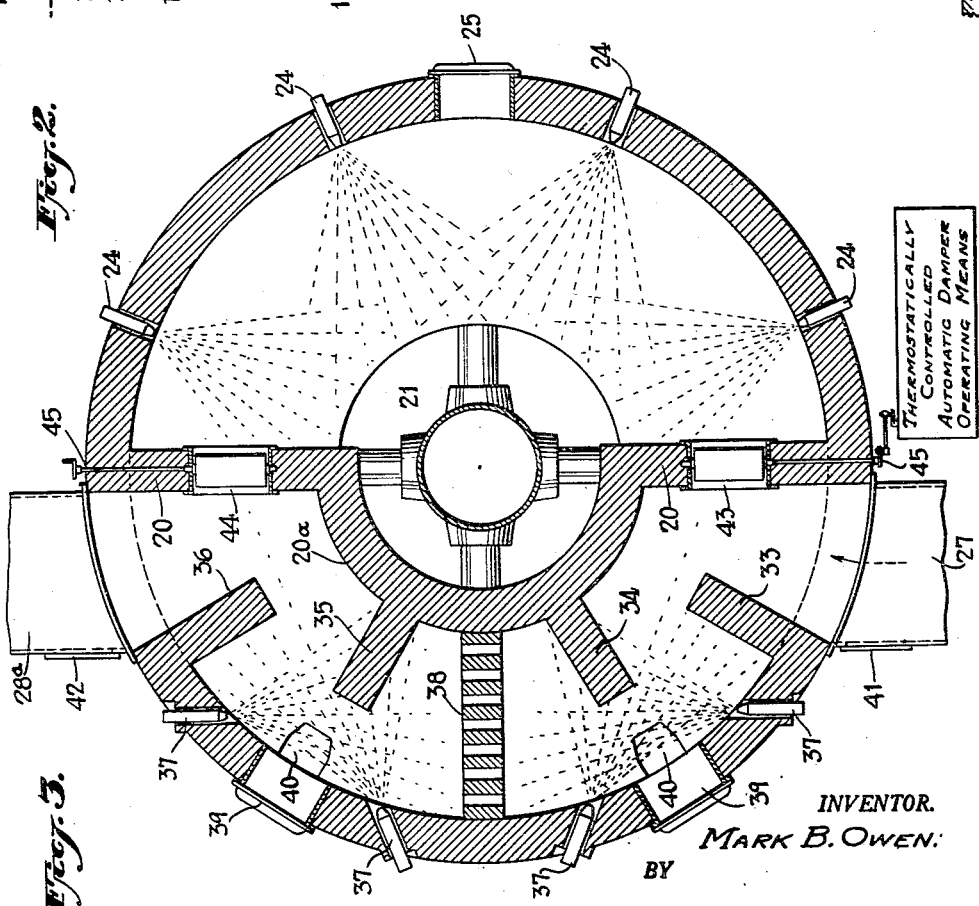

United States Patent Office 2,788,754
Patented Apr. 16, 1957

2,788,754

SLUDGE DRYING FURNACE WITH GAS DEODORIZING CHAMBER

Mark B. Owen, Indianapolis, Ind., assignor to Nichols Engineering & Research Corporation, New York, N. Y., a corporation of Delaware Application November 30, 1955, Serial No. 550,005

6 Claims. (Cl. 110—8)

This invention relates to apparatus for sludge drying or for drying and incinerating materials such as sewage sludge and the like and the deodorization of the resulting gases.

For some time furnaces of the type formed with superposed hearths and with rotary rabble arms have been used for the purpose of drying or incinerating materials such as sewage sludge. One of the problems, however, with the use of such equipment for that purpose has been the elimination of obnoxious odors from the gases evolved during the drying or burning operations. When such a multiple hearth furnace is operated as a sludge dryer, it is the general practice to pass the gases "down draft" through the furnace and to exhaust same at the bottom hearth. Normally, a large portion, for example 75% of the fuel required for such drying, is admitted at the top hearth, oil or gas burners being used for that purpose. There are times when, for various reasons, some scorching of the wet sludge will take place in the presence of the burner flames at the top hearth and this in particular gives rise to the obnoxious odors. Also there are occasions during the drying operations when the flow of material to the furnace has to be interrupted and at those times, if the high temperature gases in the top of the furnace are not quickly exhausted, the sludge will be ignited because of the absence of the normal cooling effect arising from continuous admission of wet sludge. However, it is difficult or impossible to accomplish such removal of the higher temperature gases before scorching or ignition of the sludge starts under such conditions.

According to the present invention, the above difficulties are avoided by providing a novel chamber construction at the top of the furnace, which is divided into two areas, one for receiving the burner flames for providing the hot air and gases which are drawn down through the furnace and the other area being constructed to receive the gases from a lower part of the furnace and to subject them to intensive turbulence in the presence of high temperature flames before they are discharged. Damper means is also provided which may be operated thermostatically and automatically, if desired, for allowing excessively hot gases in the first such area to be bypassed directly into the other of said areas, instead of going down into the furnace.

Other objects, features and advantages of the invention will appear from the more detailed description given below, taken in connection with the accompanying drawings, which form a part of this specification.

In the drawings:

Fig. 2 is a view similar to Fig. 1, but taken at right angles to the view of Fig. 1; and Fig. 3 is a horizontal sectional view taken substantially along line 3—3 of Fig. 2.

Figure 1:
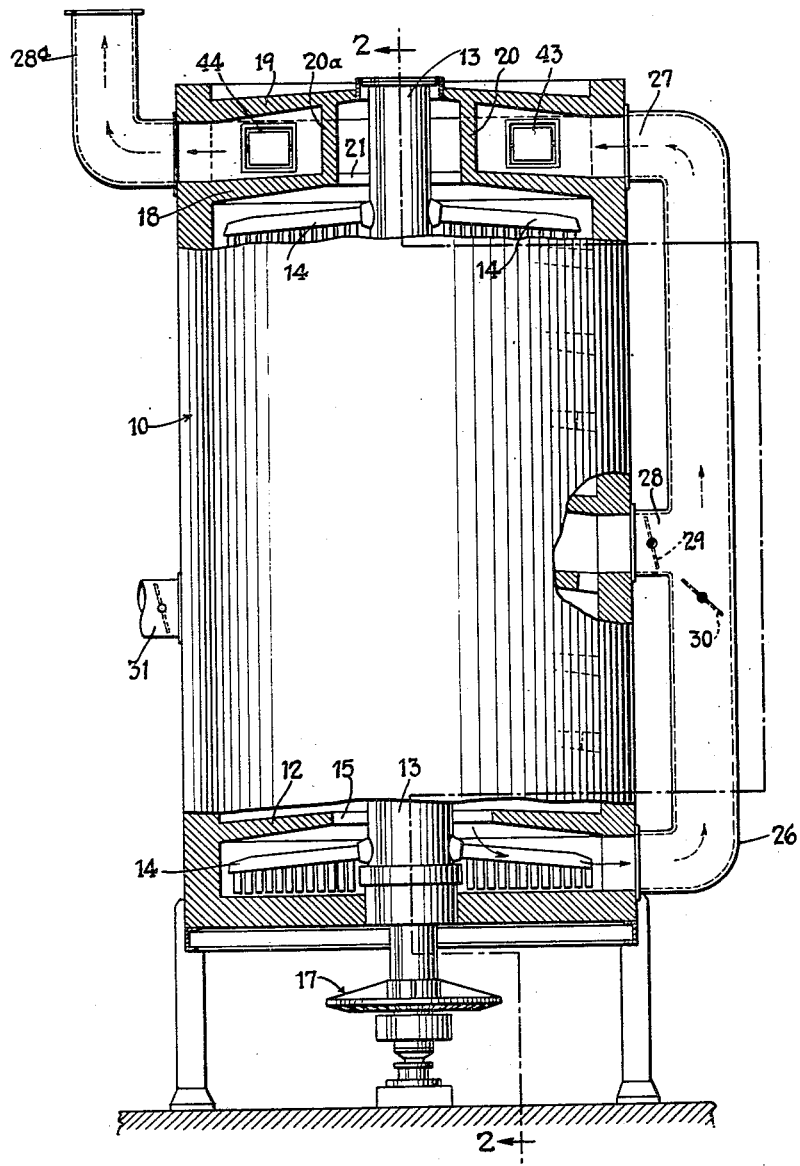
Fig. 1 is a side elevational view partly broken away, to show in vertical section certain features of the invention according to a presently preferred example thereof.

Referring now to the drawings in further detail, a multiple hearth rotary rabble arm type of furnace is shown at 10, such furnace being formed with a plurality of superposed hearths, two of which, for example, are shown in Fig. 2 at 11 and 12. The furnace is provided with a conventional form of central vertical rotary shaft 13, which carries rabble arms of a well-known type as indicated at 14 for rabbling the material gradually over each hearth outwardly and inwardly thereof on alternate hearths, the material being allowed to drop from hearth to hearth either through central drop holes (one of which is shown at 15) or through peripheral drop holes such as the one shown at 16. The shaft and rabble arm structure may be formed in the conventional way with fluid cooling cavities therein and the shaft may be rotated by a known form of motor and gear arrangement, as indicated at 17, located below the furnace.

Heretofore in the use of such multiple hearth furnaces for treating sludge, it has been customary to introduce the sludge onto the top hearth in the furnace and to use rabble arms at this hearth, and with fuel burners also located at this hearth. Thus the wet sludge would here be directly in the presence of the burners and subjected not only to the hot gases therefrom, but also to the radiant heat from the flames. This tended to result in scorching portions of the sludge in such a way as to cause excessive amounts of obnoxious gases to be evolved, and this result was particularly noticeable whenever the incoming supply of cool sludge was diminished or interrupted.

According to the present invention, however, the top hearth space, that is the space above the hearth indicated at 18 and below the furnace top 19, is arranged without rabble arms and is divided into two areas by a generally diametrically extending wall 20 having a middle arcuate portion 20a to allow for a central drop hole 21 through the hearth 18.

As shown in Fig. 2, the sludge may be introduced through an inlet 22 in the top of the furnace to fall down through central drop hole 21 onto hearth 11. At the bottom of the furnace the treated residue may be discharged through an outlet 23 preferably having any suitable known form of closure means (not shown) for preventing the escape of gases.

Referring now to Fig. 3, the top chamber area to the right of the wall 20, 20a is provided with a plurality of oil or gas burners as at 24 directed radially inwardly through the wall of the furnace and the resulting gaseous products of combustion and air coming in around the burners, flows down through drop hole 21 and to the hearths below. A cleanout door as at 25 may be provided for this part of the top chamber. With the burners thus located, it will be apparent that the flames therefrom cannot be seen from any points where the sludge is resting or located, and for this reason the sludge will not be directly exposed to scorching by radiant heat from the flames. Also, the hot gases in and about the flames will have opportunity to become thoroughly mixed to form volumes of gas of uniform temperature before same pass down through the drop hole 21 into contact with the sludge. Thus overheating the sludge by regions of excessively hot gases will be avoided.

The gases and vapors, after passing down through the furnace in succession over the various hearths, may be withdrawn through a pipe 26 extending up to a gas inlet 27 opening into the part of the top chamber to the left of the wall 20, 20a, as shown in Fig. 3. Alternatively, if desired, a part or all of the gases may be withdrawn through a branch conduit 28 connected into the furnace at an intermediate hearth, dampers being provided, if desired, as at 29, 30 to control the flow of gas as desired in these respects. In the event the lower portion of the furnace, for example, is desired to be segregated from the upper portion, that is, if the drop holes at an intermediate hearth are equipped to prevent the flow of gas therethrough in known ways, then all of the gas going up to the chamber inlet 27 may be withdrawn through the connection 28 and the gases at the lower hearths in the furnace may be caused to flow either down draft, or up draft to or from a dampered connection 31, the bottom hearth being provided with a gas opening either through the treated sludge exit opening 23 or otherwise.

In the top chamber compartment to the left of the wall 20, 20a as viewed in Fig. 3, a number of firebrick baffles as at 33, 34, 35, and 36 are provided preferably in positions to extend alternately radially inwardly from the furnace wall and outwardly from the wall portion 20a, in such manner as to provide a tortuous path for the gasses in passing from inlet 27 to outlet 28a. Pluralities of burners 37 are located to project through the furnace wall into this tortuous path to provide high temperature flames. As shown, these burners are positioned at angles so as to project flames into the somewhat restricted gas passages which occur at the ends of the baffles 34 and 35. That is, one, two or more burners may be provided at each of these restrictions, preferably some of the burners being directed at angles more or less along the path of flow of the gases, and others being directed more or less against the direction of flow thereof, thereby insuring that as the gases pass through such restrictions, they will all be subjected to turbulence and all portions thereof will be subjected to high temperature treatment by the flames, to insure decomposition of the odoriferous gases.

Further to insure turbulence, mixing and remixing of the gases, a brick checkerwork wall 38 may extend radially from wall portion 20a to the furnace wall and across the path of flow of the gases.

Access doors my be provided as at 39 enabling a tool to be introduced to scrape carbon from the interior walls of the compartment, and if desired, drop holes as at 40 covered by removable covers of high temperature resistant alloys may be provided to enable such carbon or other dirt to be discharged down to the hearth below. Cleanout doors as at 41 and 42 may be provided respectively at the gas inlet 27 and outlet 28a.

In a typical case, the gases conducted from the furnace into gas inlet 27 will be at a temperature of 350°, or from 300° to 400° F. The burners 37 should be sufficient in number to raise the temperature of such gases to about 600° F. as they pass out through the outlet 28a to a blower or stack. To accomplish this, the flames from burners 37 may be of a temperature exceeding 2000° F.

One or more dampered openings are preferably provided as at 43, 44 through the wall 20, the dampers being controllable as by cranks 45 from the exterior of the furnace, and if desired, such cranks may be operated automatically by suitable known types of thermostatic control means acting in response to the occurrence of a predetermined excessive temperature as measured, for example, at hearth 11. Thus when temperature in the upper part of the furnace rises to a point tending to cause scorching and odoriferous burning of the sludge, these dampers 43, 44 may manually or automatically opened quickly to discharge hot gases directly from the right hand side of wall 20 into the compartment at the left hand side, thereby minimizing the further flow of hot gases down into the furnace.

With the above-described arrangement, gases before going to the stack or suction blower, will be raised to a temperature sufficiently high to cause ignition of any unburned particles therein and at the same time the baffles as at 33, 36 will provide dust traps and cause, but in conjunction with the checker wall, sufficient turbulence and mixing of the gases to insure that all portions thereof will be raised to a desired deodorizing temperature.

It will be understood that furnaces equipped as above described may be used for purposes of heat treating various types of materials other than sludge, and in cases where it is desirable to keep the heat sources, such as the burner flames, out of the direct contact or presence of the material and where the treating process is such that undesired gases will be given off, of a nature to be decomposed when elevated to high temperatures.

Although one embodiment of the invention is herein disclosed for purposes of explanation, various further modifications thereof, after study of this specification, will be apparent to those skilled in the art to which the invention pertains. Reference should accordingly be had to appended claims in determining the scope of the invention.

What is claimed and desired to be secured by Letters Patent is:

1. In combination with a multiple superposed hearth furnace, a chamber construction at the top of the furnace, a wall dividing such chamber construction into two compartments, the first of said compartments being formed with a central drop hole opening to the hearth below, burners for projecting flames into said first compartment from a peripheral wall thereof, whereby hot gases will mix in such compartment and pass therefrom down through said drop hole, conduit means for conducting hot gases from a lower part of the furnace into and thereafter from the second of said compartments, said second compartment being formed with a plurality of baffles projecting into the path of the gases passing therethrought to provide a tortuous passage therefor, a checkerbrick wall also traversing said passage, and burners for projecting high temperature flames into restricted portions of such passage.

2. In combination with a sludge drying furnace, a chamber construction adjacent the top of the furnace, a wall dividing such chamber construction into two compartments, the first of said compartments being formed with a drop hole opening into the furnace below, burners for projecting flames into said first compartment at points spaced horizontally from said drop hole but whereby hot gases from such burners will pass from such compartment down through said drop hole, conduit means for conducting the hot gases from a lower part of the furnace into and from the second of said compartments, said second compartment being formed with a plurality of baffles projecting into the path of the gases passing therethrough to provide a tortuous passage therefor, and burners for projecting high temperature flames into such passage.

3. In combination with a sludge drying furnace, a chamber construction adjacent the top of the furnace, a wall dividing such chamber construction into two compartments, the first of said compartments being formed with a drop hole opening into the furnace below, burners for projecting flames into said first compartment at points spaced horizontally from said drop holes but whereby hot gases from such burners will pass from such compartment down through said drop hole, conduit means for conducting the hot gases from a lower part of the furnace into and from the second of said compartments, said second compartment being formed with a plurality of baffles projecting into the path of the gases passing therethrough to provide a tortuous passage therefor, burners for projecting high temperature flames into such passage, and dampered openings formed in said wall whereby hot gases from said first compartment may be discharged directly to the second of said compartments upon occurrence of excess furnace temperatures.

4. In combination with a multiple superposed hearth furnace, a chamber construction at the top of the furnace, a wall dividing such chamber construction into two compartments, the first of said compartments being formed with a drop hole opening to the hearth below, burners for projecting flames into said first compartment, whereby hot gases will pass from such compartment down through said drop hole, conduit means for conducting hot gases from a lower part of the furnace into and from the second of said compartments, burners for projecting high temperature flames into said second compartment, and dampered openings formed in said wall whereby hot gas from said first compartment may be discharged directly to the second of said compartments upon occurrence of excess furnace temperatures.

5. In combination with a sludge drying furnace, a chamber construction adjacent the top of the furnace, a wall dividing such chamber construction into two compartments, the first of said compartments being formed with a drop hole opening into the furnace below, burners for projecting flames into said first compartment, whereby hot gases will pass from such compartment down through said drop hole, conduit means for conducting hot gases from a lower part of the furnace into and from the second of said compartments, said second compartment being formed with a plurality of baffles projecting into the path of the gases passing therethrough to provide a tortuous passage with restricted portions therefor, and a plurality of burners for projecting high temperature flames in generally opposed directions into such restricted portions of such passage.

6. In combination with a sludge drying furnace, a chamber construction adjacent the top of the furnace, a wall dividing such chamber construction into two compartments, the first of said compartments being formed with a drop hole opening into the furnace below, burners for projecting flames into said first compartment, whereby hot gases will be formed and mingle in such compartment and then pass down through said drop hole, conduit means for conducting hot gases from a lower part of the furnace into and from the second of said compartments, said second compartment being formed with a plurality of baffles projecting into the path of the gases passing therethrough to provide a tortuous passage therefor, a checkerbrick wall also traversing said passage, and burners for projecting high temperature flames into restricted portions of such passage.

References Cited in the file of this patent
UNITED STATES PATENTS 2,655,883   Martin ---------------- Oct. 20, 1953